Aug. 7, 1962 G. B. WORTHEN ETAL 3,048,702
PHOTOELECTRIC BALANCED MODULATOR
Filed Dec. 11, 1959 2 Sheets-Sheet 1
FIG. 1
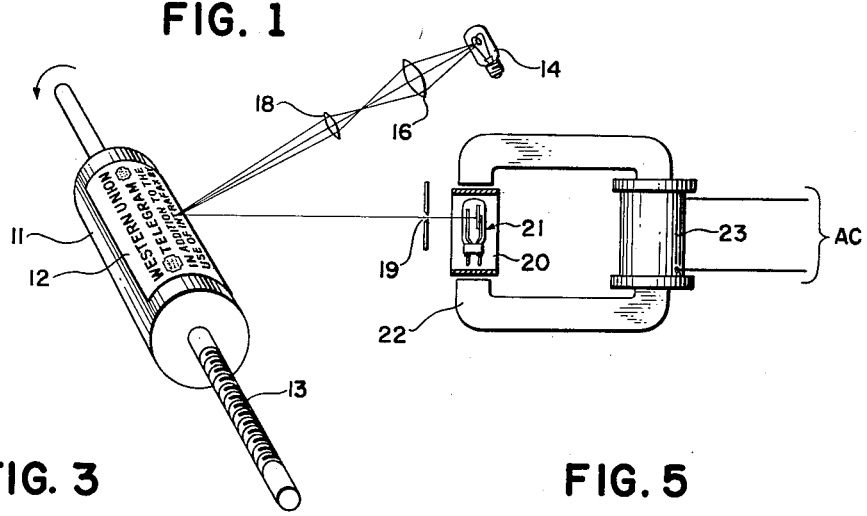
FIG. 3
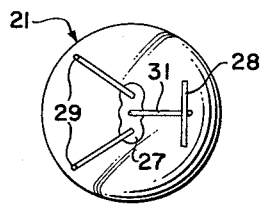
FIG. 5
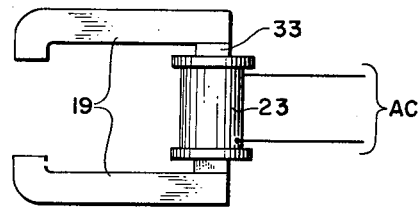
FIG. 2    FIG. 4    FIG. 6
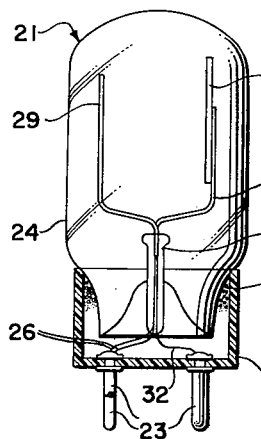 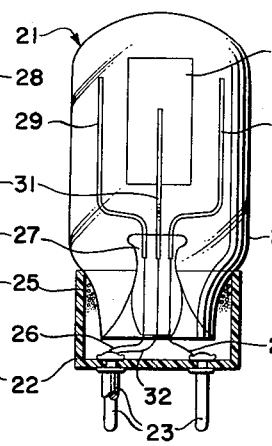 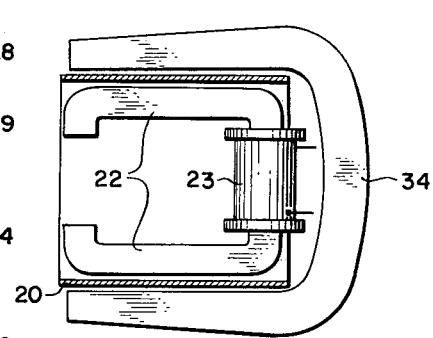
INVENTORS
GEORGE WORTHEN
CHARLES JELINEK Jr.
BY Robert Henderson
ATTORNEY Aug. 7, 1962 G. B. WORTHEN ETAL 3,048,702
PHOTOELECTRIC BALANCED MODULATOR
Filed Dec. 11, 1959 2 Sheets-Sheet 2

INVENTORS
GEORGE WORTHEN
CHARLES JELINEK Jr.
BY Robert Henderson
ATTORNEY

United States Patent Office 3,048,702
Patented Aug. 7, 1962

3,048,702
PHOTOELECTRIC BALANCED MODULATOR
George B. Worthen, New York, N.Y., and Charles Jelinek, Jr., Verona, N.J., assignors to The Western Union Telegraph Company, New York, N.Y., a corporation of New York
Filed Dec. 11, 1959, Ser. No. 858,994
3 Claims. (Cl. 250—211)

This invention relates to photoelectric pickup devices and more particularly to such a pickup capable of producing a balanced modulated output by means of magnetic modulation within the pickup.

For purposes of facsimile transmission, photoengraving, and the like, it has been the practice to employ a photocell arranged to scan successive small areas of a sheet of subject matter in a predetermined geometric pattern. Because of the low frequencies necessarily present in the output of such a scanning, and the difficulty of their amplification and transmission, as well as the criticality of illumination level and equipment sensitivity associated with the direct utilization of the photocell response, it has been the practice to modulate a suitable high frequency carrier wave according to the light intensity received by the photocell, either by modulating the illuminating beam mechanically with a carrier frequency, or by mixing the photocell output with such a carrier electrically in an external modulator.

Mechanical modulators introduce limitations as to the maximum frequency which may be employed, and are undesirably difficult and expensive to construct and maintain at a stable frequency.

When external electronic modulators are used it is usual to employ a D.C. amplifier preceding the modulator to amplify the photocell output to a suitable level for modulation. Drift due to aging of parts and to fluctuation of power supply voltages is then encountered in amplifiers of this type. An alternative arrangement which may be used to avoid these difficulties is the use of a chopper in the photocell output to convert it to A.C. so that stable high gain amplifiers may be used preceding the modulator. Such equipment is expensive and delicate, however, and does not operate to best advantage on the high impedance, low level output of a phototube.

In any event, and regardless of the method of conversion employed, facsimile modulators of the single ended type have undesirable characteristics such as the need for removal of modulating frequencies which are necessarily closely spaced to the carrier necessitating removal of the lower sideband from the output, thus leaving the carrier on the lower or less desirable side of the sideband for transmission and recording purposes.

Bridge modulators, too, display undesired effects, such as difficulty of balance adjustment at high impedance and frequency, due to the influence of stray impedances, sensitivity to frequency, lighting level, and light balance. Inversion of the modulation sense can sometimes occur due to a change in light level, and linearity of output is usually attained only at the price of very low output levels.

To overcome these difficulties, the present invention provides a photoelectric pickup cell which is capable of modulation by a local magnetic field which is supplied at the carrier frequency.

A photocell is thus provided wherein a single photoemissive cathode projects electrons to a pair of symmetrical anodes, each of which is connected to an input wire of a conventional balanced amplifier and from the output of which the upper sideband is readily removable by filtering, leaving the desired carrier and lower sideband for transmission.

Carrier injection is attained in the present invention by applying to the photocell a magnetic field generated by an electromagnet energized with carrier frequency current. The field is applied in a direction transverse to the direction of electron flow in the photocell, and transverse to the line of anode centers, so that a flow of electrons normally equally distributed between the two anodes is sufficiently bent by the field in the direction of one or the other anode depending upon the instantaneous direction of carrier current flow, and by this arrangement may be so bent to the exclusion of current flow to the alternate anode.

It is especially desirable that the carrier modulation be linear in cases where the photocell pickup is used to develop facsimile signals intended for transmission by wire over substantial distances, and this is so even in cases where the subject matter transmitted may consist only of material which is best reproduced as a high contrast black and white copy.

This is because the scanning beam must have a certain minimum dimension in order to supply enough reflected light to operate the photocell. A finite and substantial rise time is therefore present in the electrical output of the photocell regardless of the sharpness of contrast in the material scanned, and essential portions of the subject matter, if small enough in dimension, are represented by an output signal of less than saturation current magnitude, regardless of their contrast. To any extent that the pickup system departs from linearity, therefore, these transition signals which contain essential information, although in an imperfect form, are either suppressed or exaggerated, rendering their recovery difficult or impossible.

A further advantage of linear response in the pickup assembly lies in its relative insensitivity to background level variations, to fluctuations in intensity of illumination and to variations in ambient light conditions. Under linear transduction all of these anomalies are capable of transmission as they occur, subject to reception without serious degradation of the reproduction, and subject to various corrective measures such as automatic level control, which can be applied either at the transmitter or at the receiver or both to minimize their effect. When transduction is nonlinear to a greater or less degree, however, a more or less pronounced transition level is established whereby the above mentioned anomalies are enabled to drive the needed transition signals into areas of complete suppression or of undue exaggeration. They can have, in fact, such an effect on all signals, causing a serious loss of signal distinguishability over the existing electrical noise level.

The most important advantage of linear transduction is found to lie in an improved transmissibility over communication lines of limited bandwidth capabilities, which constitute the majority of facsimile applications encountered in practise. Since finite and substantial rise times are the best available from the scanner assembly in scanning even the most contrasty subject matter, as above explained, these signals are adequately represented by a limited range of harmonic frequencies comprising a modest bandwidth, and their transmission requires only modest bandwidth capability in the transmission line. If sharpened into more crisp discontinuities by the use of a nonlinear transducer, such a change would constitute merely the introduction of substantial amounts of higher order harmonics into the signal frequencies, which are largely lost by attenuation in transmission over the usual transmission line. To the extent that they are not lost, these harmonic signals are subject to severe distortion, especially delay distortion, from being without the frequency range for which the line is correctable, and as a result they often cause more damage to the reproduction in their distorted form than if they had been lost entirely.

For linearity of transducer response to produce the various advantages aforementioned, it is necessary that linearity be preserved throughout the range of operation, and it is one of the advantages of the present invention that it provides a linear response through a wide dynamic range of output power, exceeding forty decibels, and ample to encompass all reasonable extremes of input function variation.

In the instant invention, the bending of the electron beam is found to be accomplished in a linear fashion, so that efficiency of the modulation is high, and the output of undesired harmonics is negligible, even when the output of the device is maintained at a relatively high level. Noise generation is thereby decreased. Because of the good linearity above referred to, and the excellent stability of the balanced modulator, a desirably low level of carrier distortion is also attained.

It is therefore an object of this invention to provide a modulated photoelectric pickup device which has a wide range of linear response.

It is a further object of the invention to provide such a device capable of simple and convenient modulation by magnetic carrier injection.

A still further object is to provide a device having low carrier distortion in the output thereof.

Another object is to provide a pickup having a relatively high level of modulated output.

Still another object is to provide a detection and measuring device for magnetic fields capable of producing a modulated output.

Further objects of the invention will become apparent from the following detailed description of a specific example thereof, taken in conjunction with the appended drawings, wherein:

FIG. 1 is a schematic representation of a facsimile scanning system employing the present invention;

FIG. 3 is a top view of a photocell comprising FIG. 1;

FIG. 2 is a side view of FIG. 3;

FIG. 4 is a front view of FIG. 2;

FIG. 5 is a side view of an alternative component of FIG. 1;

FIG. 6 is a side view of an alternative component of FIG. 1;

Figure 7:
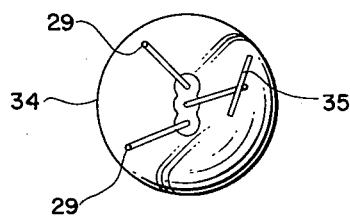
FIG. 7 is a top view of an alternative photocell.

Turning now to the drawings, there is seen in FIG. 1 a rotatable drum 11 carrying a message form 12 and provided with a lead screw 13 on its axle for scanning by drum rotation and lead screw advancement in the usual manner. A lamp 14 supplies a beam of light which is concentrated by condensing lens 16 and imaged on message blank 12 by the projection lens 18 in the form of a bright spot of small size, all in the conventional manner. Light diffusely reflected from this spot is selected by aperture 19 and impinges upon phototube 21 which is surrounded by an electromagnetic core 22 energized by coil 23, and by an electrostatic shield of metal 20 as needed, and as shown partially cut away for clarity of presentation.

Photocell 21 is seen more clearly in FIG. 2 wherein a base 22 with contact pins 23 is affixed to an evacuated glass envelope 24 by adhesive foam 25. Wires 26 lead from pins 23 through a press 27 to a non-magnetic photocathode 28 and also to anodes 29 which are seen more clearly in FIGS. 3 and 4 to comprise spaced cylindrical elements connected each to a separate base pin 23. Cathode 28 is seen to be supported upon a wire 31 connected by a lead wire 32 to a separate base pin such as 23, and is further seen to comprise a rectangular plate so disposed as to illuminate by emission of photoelectrons both of the anodes 29 in such a manner that any severe bending of the electron trajectories in planes parallel to the mounting base plane can cause illumination of one anode to the practical exclusion of the other. From the symmetrical arrangement of the tube elements it is further apparent that which of the particular anodes is thus excluded from space current participation depends solely upon the sign of the bending force applied to the electron trajectory.

Core 22 of FIG. 1 as energized by coil 23 provides a magnetic field directed along the axis of phototriode 21 for bending the trajectories of photoelectrons emitted by cathode 28 toward either of the anodes 29 according to the direction of current flow in the coil 23, and to an extent depending upon the strength of that current. It is evident that residual magnetism can be induced in the core 22 as a consequence of any permanent magnetism which may be provided in the core material, or as a consequence of the introduction of permanently magnetic material 33 in series with the pole pieces 15 of the magnetic circuit as shown in FIG. 5 or in parallel therewith as shown at 34 in FIG. 6.

By this means the phototriode 21 may be biased to quiescent exclusion of one of the anodes 29 so that bidirectional currents in the coil 23 are not required in order to produce a balanced modulate output, but modulated direct current such as occurs in the plate circuit of a vacuum tube oscillator or the collector circuit of a transistor oscillator may be used without transformation for this purpose.

To the same purpose, a construction of the phototriode 24 according to FIG. 7 as a variant of FIG. 3 may be employed, wherein a photocathode 35 is caused by orientation or displacement or both as shown, to illuminate preferentially one of the anodes 29 when in the quiescent condition, so that exclusion of space current from the alternate anode occurs in the absence of modulating signals. Although balanced signal output is obtainable from the configurations of FIGS. 5, 6 and 7 as above described, ths desirable result is attained in such cases only under conditions of modulation by a signal of constant predetermined amplitude, and unless such a signal is readily available, the construction shown in FIG. 3 and in FIGS. 8, 9 and 10 to be described, are preferred.

Figure 8:
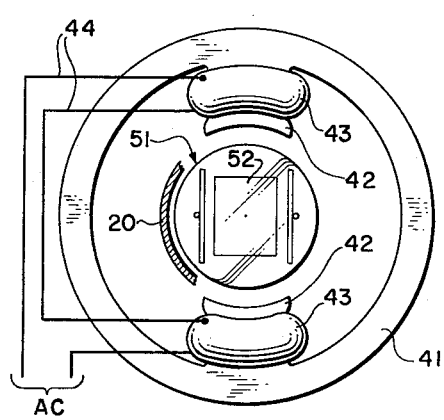
FIG. 8 is a front view of an assembly comprising another form of the invention.

In FIG. 8 there is seen a front view of a modified form of the invention wherein a shield 20 is within a core of magnetic material 41 having salient poles 42 and having pole windings 43 connected together for simultaneous operation by the interconnection wires 44 through which current is supplied from an A.C. source of modulating current not shown. A phototriode 51 is mounted within the gap of the poles 42 so that the space current path of photoelectrons emitted by cathode 52 lies within the magnetic field of core 41.

Figures 9, 10:
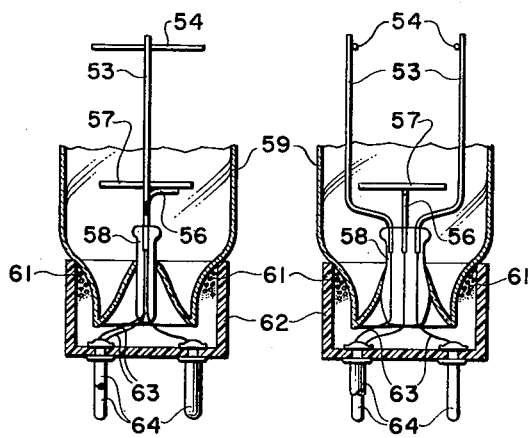
FIG. 9 is a side view of a photocell comprising FIG. 8.
FIG. 10 is a front view of FIG. 9.

The modified form of phototriode employed to provide the compact frontal display of FIG. 8 is seen more clearly in the side and top views of FIGS. 9 and 10, wherein supporting wires 53 carry the anode wires 54 and supporting wire 56 carries the cathode plate 57 in the glass press 58 which is a part of evacuated glass envelope 59 retained by adhesive 61 in base 62. It is again to be observed that leads 63 connecting wires 53 to pins 64 are separate for the two anodes 54 so that a balanced circuit may be employed.

Figure 11:
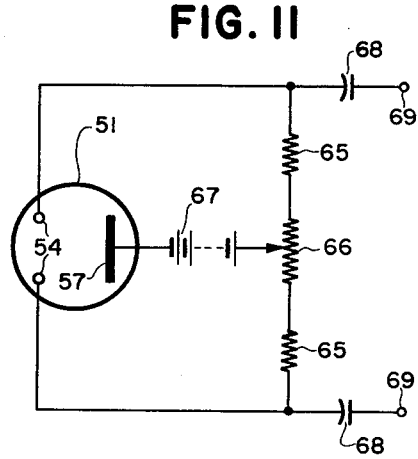
FIG. 11 is a wiring diagram of the invention.

Such a balanced circuit is shown in FIG. 11, wherein phototube 51 has anodes 54 connected together through resistors 65 and potentiometer 66, the slider thereof being connected to a positive D.C. source of voltage such as a battery 67, the negative wire of which is connected to the cathode 57 of phototube 51. Balanced signal output is taken across anodes 54 through blocking condensers 68 to terminals 69. The same diagram applies unchanged to the embodiment of phototriode 21 of FIG. 1.

Figure 12:
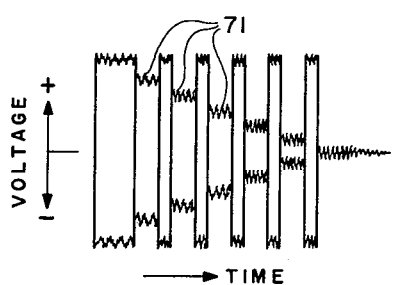
FIG. 12 is a representation of electrical relationship obtainable by the invention.

When the message form 12 of FIG. 1 consists of a series of stripes of varying density separated by blank spaces, their successive scanning produces the repetitive pattern of output voltage at terminals 69 shown at FIG. 12, as seen on the screen of a cathode ray oscilloscope. The regularity of the descending stages 71 demonstrates the excellent linearity of the output voltage of the instant invention, and the large number of steps obtainable over a considerable range of voltage, its wide dynamic range.

It will be evident that since the present invention makes use of the principle of electron deflection by means of a magnetic field directed across their path, it is desirable that the electrons shall travel at relatively slow speed in order that they may be more susceptible to this influence, in order that the sensitivity of the device to magnetic modulating forces may be increased. This could be accomplished by reducing the anode potential and thus avoiding strong acceleration of the electrons. This, however, causes an undesired reduction in anode current, so that the favorably high operating level of the device is reduced. We prefer to establish a non-uniform potential gradient in the path of the electron stream such that a high gradient exists in the vicinity of the cathode, and a lesser gradient in the remainder of the path, whereby cathode emission is freed of some of the restrictive influence of the space charge effect while anode potential remains low enough to achieve high deflection sensitivity in the electron stream.

Figure 13:
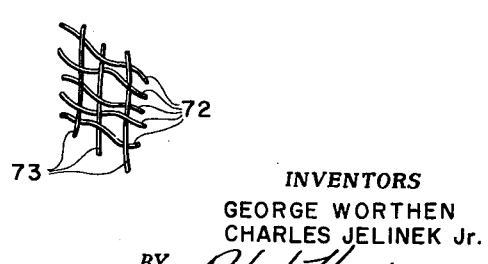
FIG. 13 is a view of an alternative cathode structure for FIG. 8.

This we accomplish in the present invention by providing a photocathode structure having a multiplicity of surfaces formed on a relatively small radius of curvature, as, for example may be seen in the construction shown in FIG. 13, where 73 indicates wires in a photocathode composed of small diameter wires in a parallel array and connected together, as by cross wires 72 woven between them. In this manner, an increased sensitivity of the device to the deflecting influence of a magnetic field may be obtained.

It will be apparent that the sensitivity of the output signal of the instant device to the influence of a magnetic modulating field, and its linearity of response, render it further well adapted for use as a means of detecting and measuring the intensity and direction of ambient magnetic fields. In the same way that a modulating magnetic field is effective in simplifying and improving the detection of optical information, when applied to the instant invention, so a beam of light varied in intensity at a certain rate by some chosen modulating frequency can be used in exciting the instant device to simplify the measurement of an unknown magnetc field which is constant or varying at some different rate, and into which the phototriode is introduced for that purpose.

Although this invention has been dscribed in terms of a specific illustrative example of the preferred embodiment thereof, it will be understood that various modifications and alterations will occur to those skilled in the art which do not depart, however, from the essential spirit of the disclosed invention, and it is therefore intended that the invention shall be limited only by the appended claims.

What is claimed is:

1. In a photoelectric pickup for facsimile transmission, a phototriode comprising a hermetic envelope, a photoemissive planar cathode and a pair of electrically mutually independent photoelectron receiving anodes spaced therefrom and located in spaced apart regions of said envelope, said cathode being narrower than the distance between said anodes; electromagnet means for applying across the path of photoelectron stream travel from said photocathode a modulating frequency magnetic flux field having sufficient instensity to bend the stream completely away from either and onto the other of the said anodes, polarizing means for said anodes, means to illuminate said photoemissive cathode with variable quantity of exciting radiation, comprising an input signal, metallic shield means surrounding said envelope for photoelectron stream stabilization against adventitious ambient deflecting influences, and circuit means for extracting a balanced modulated signal output from said anodes.

2. Photoelectric facsimile pickup means comprising a photoemissive planar cathode mounted for light input sensing, a separated plurality of independently electrically connected anodes spaced therefrom by a photoelectron drift path distance adequate to provide sufficient focusing of cathode emission to cause extinction of space current to one anode to be accompanied only by augmentation of space current to another anode, said cathode being narrower than the distance between any adjacent pair of said anodes, electromagnetic circuit means for establishing a sinusoidally varying magnetic flux normal to said drift path and to an anode center joining line, shield means encircling said drift path, and circuit means connected to said anodes for withdrawing a balanced modulated facsimile signal output.

3. A modulatable photocell for transducing input signals occurring at rates up to the neighborhood of a modulating frequency and comprising a surrounding and supporting envelope having a transparent portion, a photoemissive planar cathode therein having an unobstructed view of such transparent portion, a first anode located for normal full illumination by photoelectrons emitted from said cathode upon cathode energization, and a second anode located remotely from the stream of normal photoelectron flow from said cathode upon cathode energization, said first and said second anodes being spaced from said cathode a distance sufficient to cause photoelectron stream deflection away from said first and onto said second anode in the presence of a deflecting electromagnetic field, said distance exceeding the width of said cathode, and means including said envelope for causing said cathode and said first and said second anodes to be threaded by a magnetic field directed normally to the plane of the centers thereof.

References Cited in the file of this patent

UNITED STATES PATENTS

| | | |
|---|---|---|
| 1,486,221 | Berry | Mar. 11, 1924 |
| 1,898,080 | Culver | Feb. 21, 1933 |
| 1,988,505 | Morandini et al. | Jan. 22, 1935 |
| 2,952,813 | Kalmus et al. | Sept. 13, 1960 |

FOREIGN PATENTS

| | | |
|---|---|---|
| 1,098,556 | France | Mar. 9, 1955 |